US008964525B1

(12) United States Patent
Kuthanur et al.

(10) Patent No.: US 8,964,525 B1
(45) Date of Patent: Feb. 24, 2015

(54) METHODS AND APPARATUS FOR ENHANCING FAULT MANAGEMENT USING INTER-WORKING BETWEEN PPP AND ETHERNET

(75) Inventors: Gowri Kuthanur, San Jose, CA (US); James L. Brede, Santa Rosa, CA (US)

(73) Assignee: Tellabs Operations, Inc., Naperville, IL (US)

( * ) Notice: Subject to any disclaimer, the term of this patent is extended or adjusted under 35 U.S.C. 154(b) by 316 days.

(21) Appl. No.: 13/245,642

(22) Filed: Sep. 26, 2011

(51) Int. Cl.
*H04L 12/26* (2006.01)
(52) U.S. Cl.
CPC ....................................... *H04L 12/26* (2013.01)
USPC .......................................................... 370/216
(58) Field of Classification Search
CPC .................... H04L 41/0686; H04L 41/0654
USPC .......................................................... 370/216
See application file for complete search history.

(56) References Cited

U.S. PATENT DOCUMENTS

| 8,195,149 | B2 * | 6/2012 | Parker .......................... 455/426.1 |
| 2004/0252717 | A1 * | 12/2004 | Solomon et al. .............. 370/466 |
| 2009/0208201 | A1 * | 8/2009 | Emongkonchai ................. 398/7 |
| 2010/0001586 | A1 * | 1/2010 | Bernard et al. ................. 307/65 |
| 2011/0080870 | A1 * | 4/2011 | Bhalla et al. .................. 370/328 |
| 2012/0087232 | A1 * | 4/2012 | Hanabe et al. ................ 370/217 |

OTHER PUBLICATIONS

"ARP Mediation for IP Interworking of Layer 2 VPN draft-ietf-l2vpn-arp-mediation-15.txt" The Internet Engineering Task Force—L2VPN Working Group Nov. 10, 2010 Himanshu Shah (Ciena).

* cited by examiner

*Primary Examiner* — Huy D Vu
*Assistant Examiner* — Bao G Nguyen
(74) *Attorney, Agent, or Firm* — James M. Wu; JW Law Group

(57) ABSTRACT

Embodiments of the present invention illustrate a network configuration having a subscriber node, a multiservice router ("MSR"), and an edge router, wherein the MSR is able to provide end-to-end fault notifications across a multiservice environment. The MSR, for example, provides a process capable of translating a fault notification between two or more protocols. Upon receipt of a first fault notification formatted in a first protocol over a first circuit from a subscriber node, MSR translates the first fault notification to a second fault notification which is formatted in the second protocol. The first protocol and second protocol are different protocols. The second fault notification is subsequently sent from the MSR to an edge router via a second circuit.

19 Claims, 5 Drawing Sheets

METHODS AND APPARATUS FOR ENHANCING FAULT MANAGEMENT USING INTER-WORKING BETWEEN PPP AND ETHERNET

FIELD

The exemplary embodiment(s) of the present invention relates to communications network. More specifically, the exemplary embodiment(s) of the present invention relates to improve fault management across multiple network environments.

BACKGROUND

A high-speed network environment typically includes network devices such as access switches, routers, and bridges used to facilitate delivery of information packets and/or data traffic from source devices to destination devices. Information pertaining to the transfer of packet(s) through the network is usually embedded within the packet itself. Each packet traveling through one or more communications networks such as Internet, multiprotocol label switching ("MPLS") network, Ethernet, and/or point-to-point protocol ("PPP") based network can typically be handled independently from other packets in a packet stream or traffic. For example, each node which may include routing, switching, and/or bridging engines processes incoming packets and determines where the packet(s) should be forwarded.

To maintain data integrity, it is important to keep high speed traffic flows with minimal data loss and/or packet drop. With growth and innovation of new information technology, the network configuration becomes huge and more complicated than ever before. A typical data packet, for example, traveling from a source to destination can easily cross multiple networks employing different network protocols, such as PPP network, Ethernet, MPLS, and/or Internet. Since different network typically employs different protocol, packet handover from one network to another seamlessly becomes ever more challenging.

A conventional approach to resolve smooth handover between different networks using different protocols is to use interworking functions such as IPL2 Shah Circuit under Internet Engineering Task Force ("IETF"). A problem, however, associated with the conventional approach is that it does not provide a complete solution for interworking service between multiple network protocols. For example, Current industry standards do not provide a complete OAM (Operations, Administration, and Management) solution for service interworking of PPP to Ethernet.

SUMMARY

A network configuration, having a subscriber node, a multiservice router ("MSR"), and an edge router, is able to provide end-to-end fault notifications across a multiservice environment. The MSR, for example, provides a process capable of translating a fault notification between two or more protocols. Upon receipt of a first fault notification formatted in a first protocol over a first circuit from a subscriber node, MSR translates the first fault notification to a second fault notification which is formatted in the second protocol. The first protocol and second protocol are different protocols. The second fault notification is subsequently sent from the MSR to an edge router via a second circuit.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
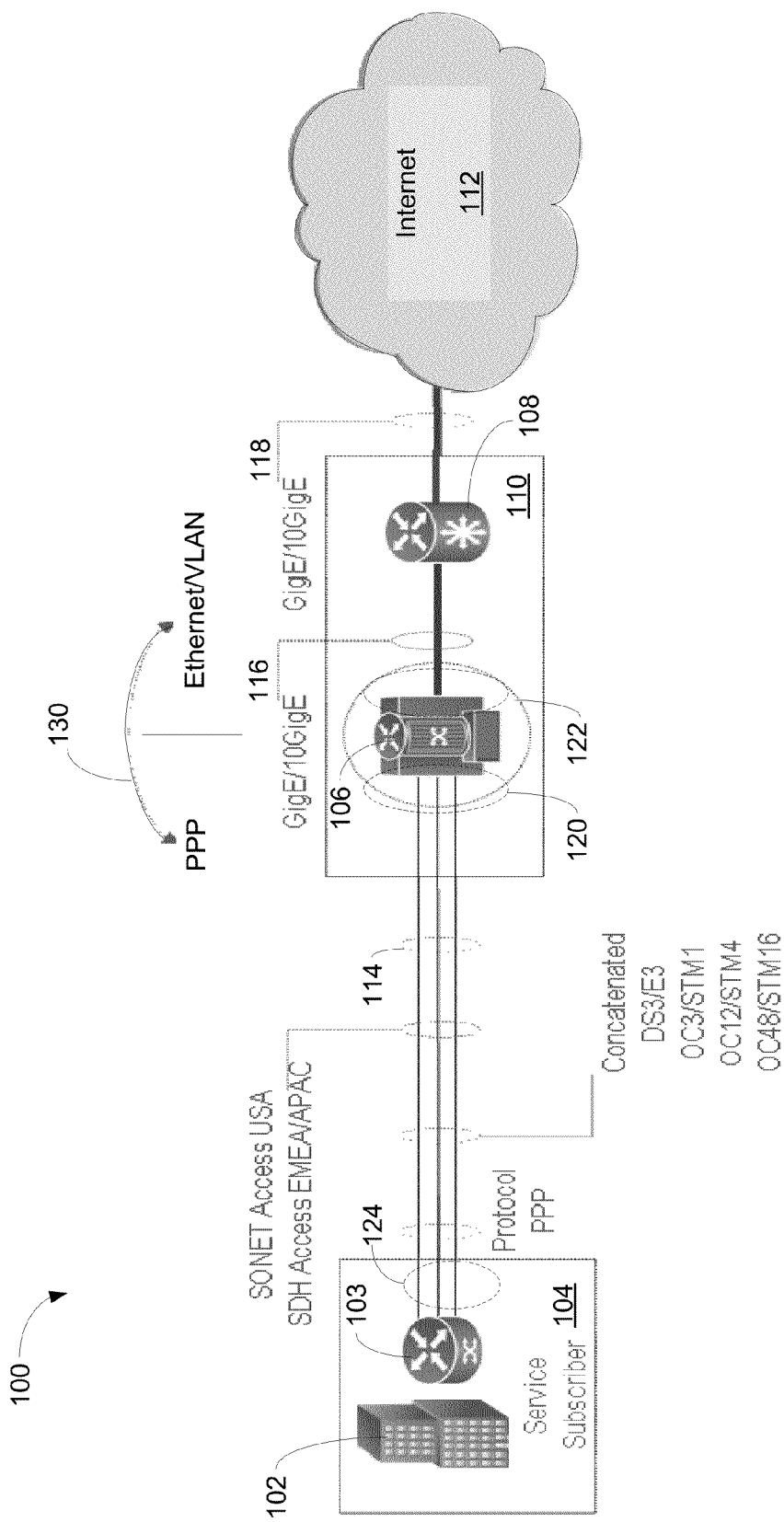
FIG. 1 is a block diagram illustrating a computer network having a multiservice router capable of translating fault notifications between multiple network protocols in accordance with one embodiment of the present invention.

Exemplary embodiment(s) of the present invention is described herein in the context of a method, device, and apparatus configured to enhance fault management by allowing a link failure message to travel through multiple network environments.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, for example of ATM (Asynchronous Transfer Mode) type, on a transport medium, such as the TCP/IP or UDP/IP type. ATM cells are the result of decomposition (or segmentation) of packets of data, for example, IP type, and those packets (here IP packets) comprise an IP header, a header specific to the transport medium (i.e., UDP or TCP) and payload data. The IP network may also include a satellite network, for example a DVB-RCS (Digital Video Broadcasting-Return Channel System) network, providing Internet access via satellite, or an SDMB (Satellite Digital Multimedia Broadcast) network, or a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Embodiments of the present invention illustrate a network configuration having a subscriber node, a multiservice router ("MSR"), and an edge router, wherein the MSR is able to provide end-to-end fault notifications across a multiservice environment. The MSR, for example, provides a process capable of translating a fault notification between two or more protocols. Upon receipt of a first fault notification formatted in a first protocol over a first circuit from a subscriber node, MSR translates the first fault notification to a second fault notification which is formatted in the second protocol. The first protocol and second protocol are different protocols. The second fault notification is subsequently sent from the MSR to an edge router via a second circuit.

FIG. 1 is a block diagram 100 illustrating a computer network having a multiservice router ("MSR") capable of translating fault notifications between multiple network protocols in accordance with one embodiment of the present invention. Diagram 100 includes a service subscriber node 104, a MSR or router 106, an edge router 108, and Internet 112. Service subscriber node 104 is a network element ("NE") that includes subscriber servers 102 and subscriber routers 103. Routers 106-108, in an alternative aspect, form a node 110 which couples to Internet 112 via a link 118. Node 104 is connected to MSR 106 via a link 114. It should be noted that the underlying concept of the exemplary embodiment(s) of the present invention would not change if one or more blocks (or elements) were added to or removed from diagram 100.

Service subscriber node or node 104, in one embodiment, is a hub for one or more service providers, wherein the hub includes one or more routers 103 and provider servers 102. Node 104 may further include users and/or user equipments ("UEs"), not shown in FIG. 1, and one or more ports 124 configured to interface with one or more network circuits governed by a protocol, such as synchronous optical networking ("SONET"), Synchronous Digital Hierarchy ("SDH"), and/or time-division multiplexing ("TDM"). To reach or access a public network or Internet 112, node 104 sends a data packet from its interface port to Internet 112 via node 110. The PPP, in one embodiment, is used to manage the data transfer over link 114 which can also be referred to as PPP circuit. To manage data integrity over the PPP circuit, the link control protocol ("LCP") of PPP is used to manage the connectivity of the PPP circuit or link 114.

SONET and SDH are standardized multiplexing protocols which are used to transmit packet streams via optical fiber(s) using lasers or lighting device. TDM, on the other hand, is capable of multiplexing two or more separate data streams into a single vehicle whereby data streams are transferred simultaneously using one or more sub-channels. A TDM line, also known as T-line, offers TDM interfaces to various connection standards, such as T1, E1, T3, E3, OC-3, OC-12, OC-48, et cetera. It should be noted that link 114 or PPP circuit supports protocols SONET, SDH, TDM, as well as other standards.

Link 114, in one embodiment, is a PPP circuit capable of transporting data packets or packet stream over one or more OC (optical carrier) line or DS3 (digital signal 3) line. A DS3 is a digital signal level 3 also known as T-carrier or T3 line. For instance, DS3 line is a 75 ohm coaxial cable and connectors. The PPP is a network protocol capable of transporting multi-protocol datagrams over a point-to-point link. The PPP includes a method of encapsulating multi-protocol datagrams and LCP which is used for establishing, configuring, and testing link connections. The LCP is able to perform various functions including, but not limited to, managing the identity of a linked device, terminating a link, establishing/configuring a link, searching for errors, et cetera.

OC-1, on the other hand, is used to transmit signals which may be carried and organized in SONET by a fiber optic network. Note that OC can be viewed as basic transmission rate of bit stream. OC-3 transmission medium is considered as 3 times the transmission capacity of OC-1. As such, If the base unit is 51.84 Megabit per second ("Mbit/s"), the speed of OC-n is n×51.84 Mbit/s. Concatenated OC3/STM1 refers to 3OC-1 streams interleaved with each other to increase data transmission. In the carrier environments, service subscribers employ various connections that are carried from TDM and SONET/SDH interfaces to aggregate low speed (sub-DS3) connections for Layer 3 services such as Public Internet and L3 VPN services.

Edge router 108, also known as NE or edge gateway router, is coupled to Internet 112, and routes data traffic or packet stream to and from Internet 112 and router 106 via an Internet Protocol ("IP") based network circuit 118. IP based network circuit 118, for example, is Ethernet based virtual local area network ("VLAN"). VLAN is capable of transmitting Ethernet frames at a rate of one gigabit per second ("GigE") between edge router 108 and Internet 112. Note that VLAN having a transmitting rate of 10 or 100 GigE may be used.

An edge router or router 108, for example, is an NE or network device capable of forwarding data packets across one or more communication networks in accordance with its routing mechanism such as a routing table. A router may be a microprocessor-controlled computing system which may be coupled to two or more data lines configured to direct data traffic through one or more communication networks. NE or network client, in one example, can include one or more routers, hubs, switches, hosts, base stations, and the like.

Ethernet is local area networks ("LANs") for computer communications network. Under IEEE 802.3, Ethernet organizes its data stream into packets which is also referred to as frames. Each frame includes source address, destination address, verification bits, and the like. Retransmitting frames that fail to reach their destination are performed when data loss or link failure is detected.

MSR 106, in one embodiment, includes a set of SONET ports 120 and a set of Ethernet ports 122. A function of MSR 106 is to facilitate or pass a fault notification across multiple network environments. For example, MSR 106 handovers a fault message or notification from one link using a first protocol such as the PPP to another link using a second protocol such as Ethernet. SONET ports 120 of MSR 106 are used to couple to SONET ports 124 of node 104 via PPP circuit 114. It should be noted that PPP circuit and link 114 are herein used interchangeably. MSR 106, in one embodiment, includes a protocol translation module which is able to translate or convert link failure message (or notification) between different network protocols.

The protocol translation module may be hardware, software, or a combination of hardware and software. The protocol translation module translates the link failure messages between the LCP message formatted in the PPP and a continuity check message ("CCM") formatted in IEEE 802.1ag. The connectivity verification protocol, for example, may use CCM under IEEE 802.1ag standard, which hereinafter can also be referred to as 802.1ag CCM.

IEEE 802.1ag Ethernet CFM (connectivity fault management) Protocol includes continuity check, CCMs, link trace and loopback protocols for assisting network operators to maintain/manage the network. IEEE 802.1ag defines a construct called MEP (maintenance association end points), which is capable of sending periodic CC messages PDUs (protocol data units) and receiving CCM PDUs. The MEP at each node such as MSR 106 and edge router 108, which is also referred to as Down MEP, sends a CCM over a port of a node through a link to periodically verify the connectivity between the two nodes. Since Down MEP is able to send a message in a direction to a port, it is well suited to employ as a protocol entity to detect node connectivity at the link level. It should be noted that both Up MEP & down MEP are capable of receiving the CCMs alike. Upon enabling of Down MEPs at routers 106-108, CCMs are periodically sent, monitored, and received for connectivity verification.

Ethernet ports 122 of MSR 106 are used to couple to Ethernet ports at edge router 108 via a VLAN, Ethernet circuit, or link 116. It should be noted that VLAN and link 116 are herein used interchangeably. The protocol translation module of MSR 106 is responsible to covert or translate fault notification(s) between LCP and 802.1ag CCM. In one embodiment, link 116 and link 118 are similar link using similar or same protocol. Note that 802.1ag CCM can also be replaced or referred to as Ethernet OAM fault notification.

Referring back to FIG. 1, an embodiment of the present invention discloses process to enable interworking of OAM protocols including different technologies and provides fault message translation between LCP for PPP and IEEE 802.1ag Ethernet OAM as indicated by numeral 130. MSR 106 provides a process allowing an end-to-end fault notification to cross a multiservice environment including service interworking of PPP based access and Ethernet based access. For example, the PPP circuit LCP message is translated to an 802.1ag CCM message, wherein Ethernet trunk may contain the status of individual VLAN associated with a PPP circuit.

An advantage of employing the embodiment of the present invention is to enhance fault management by allowing a link failure message to travel through multiple network environments.

Figure 2:
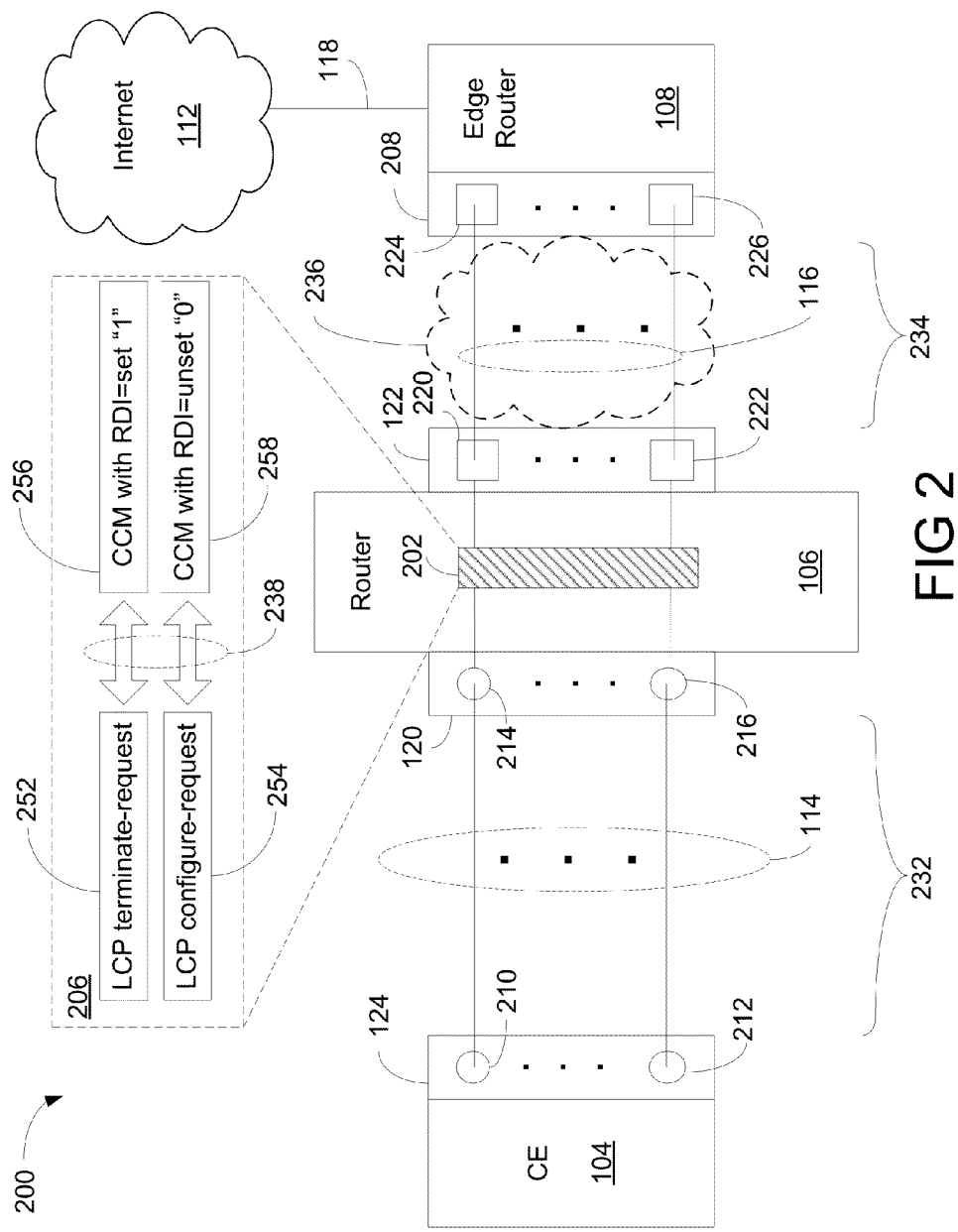
FIG. 2 is a block diagram illustrating a simplified exemplary computer network capable of translating fault notifications between multiple protocols in accordance with one embodiment of the present invention.

FIG. 2 is a block diagram 200 illustrating a simplified exemplary computer network capable of translating fault notifications between multiple protocols in accordance with one embodiment of the present invention. Diagram 200, similar to diagram 100 shown in FIG. 1, includes node 104, MSR 106, edge router 108, and Internet 112, wherein MSR 106 further includes a protocol translation module ("PTM") 202 used to provide fault notification translation between standards and/or protocols. Node 104 includes customer premises equipments ("CEs") such as subscriber servers and subscriber routers. MSR 106 is coupled with node 104 through ports 120 and 124 via link 114 and is coupled to edge router 108 through ports 122 and 208 via link 116. It should be noted that the underlying concept of the exemplary embodiment(s) of the present invention would not change if one or more blocks (or elements) were added to or removed from diagram 200.

Ports 120 and 124, in one embodiment, includes SONET interfaces, SDH interfaces, TDM interfaces, or a combination of SONET, SDH, and/or TDM interfaces 210-216. Ports 120 and 124 are used to interface with PPP circuit 114 for facilitating data traffic or packet flows between node 104 and MSR 106. Depending on the applications, ports 120 and 124 may include PPP based interfaces, Ethernet based interfaces, and a combination of PPP and Ethernet interfaces.

Ports 122 and 208, in one embodiment, includes Ethernet interfaces 220-226 wherein interfaces 220-226 are used to communicate with VLAN or link 116 for facilitating data traffic or packet flows between MSR 106 and edge router 108. Depending on the applications, ports 122 and 208 may include PPP based interfaces, Ethernet based interfaces, and a combination of PPP and Ethernet interfaces. In an alternative embodiment, a switching network 236 is configured and/or formed between MSR 106 and edge router 108 for facilitating traffic flow. The switching network 236 can be any type of networks such as MPLS or MEN (metro Ethernet Network).

PTM 202, in one embodiment, is a component of MSR 106 which can be hardware, software, firmware, or a combination of hardware, firmware, and/or software. PTM 202 is configured to translate or convert between LCP link failure messages and 802.1ag CCM link failure messages. For example, operation or function box 206 illustrates a translator 238 which is able to translate between LCP terminate-request 252 and 802.1ag CCM with RDI having a set value ("1") 256. Translator 238 is also capable of converting between LCP configure-request 254 and 802.1ag CCM with RDI having an unset or clear value ("0") 258. PTM 202, in one aspect, includes additional functional blocks, such as identifying incoming data standard, verifying output requirements, and conversion required.

To interact or interwork LCP with IEEE 802.1ag Ethernet OAM, various translating or triggering operations, in one embodiment, are introduced and/or performed. In one aspect, when PTM 202 receives or detects an 802.1ag session time out or loss of continuity ("LOC") from Ethernet side 234, it triggers to generate an LCP terminate-request message which is subsequently sent to PPP side 232. When PTM 202 receives an 802.1ag session restore from Ethernet side 234, it triggers to generate an LCP configure-request message which is subsequently forwarded to PPP side 232. If PTM 202 detects or receives an 802.1ag CCM with RDI Set from Ethernet side 234, it triggers to generate an LCP terminate-request message which is subsequently forwarded to PPP side 232. Also, upon obtaining an 802.1ag CCM with RDI Clear (RDI=0), PTM 202 converts the 802.1ag CCM with RDI Clear (RDI=0) to LCP configure-request message, and subsequently sends the LCP configure-request message to PPP side 232. When PTM 202 receives or detects an LCP terminate-request message, it triggers to generate an 802.1ag CCM with RDI Set Message (RDI=1), and PTM 202 subsequently sends the 802.1ag CCM with RDI=1 to Ethernet side 234. When PTM 202 obtains an LCP configure-request message, it triggers to generate an 802.1ag CCM without RDI message indicating restoring or resumption of the link.

In an alternative embodiment, PTM 202 is able to handle mixed protocols wherein PTM 202 checks and decides whether a protocol translation is needed before the fault notification is handed over to the subsequent network. For example, an identifying block of PTM 202 determines the type of protocol that is used to compose the data flow. The verifying block of PTM 202 determines the protocol for the output traffic flow or fault notification in response to the received data flow or fault notification. The conversion block of PTM 202 determines whether a translation is needed before the data flow is to be routed.

Figure 3:
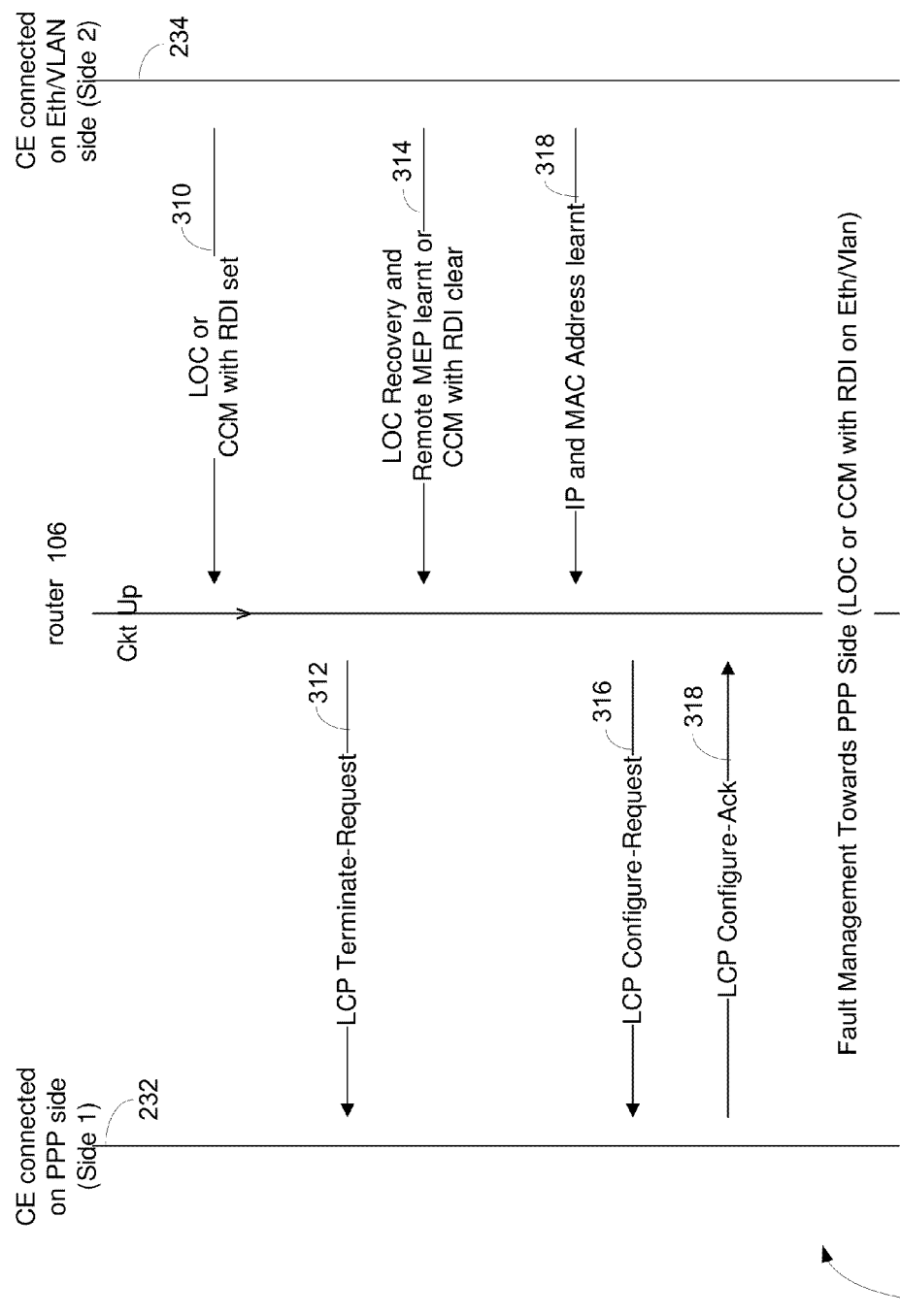
FIG. 3 is a logic flow diagram illustrating an exemplary process of fault management toward PPP side in accordance with one embodiment of the present invention.

FIG. 3 is a logic flow diagram 300 illustrating an exemplary process of fault management toward PPP side in accordance with one embodiment of the present invention. The process of network fault management receives an LOC or CCM with RDI=1 (set value) formatted in IEEE 802.1ag indicating a link failure from Ethernet side 234 to MSR 106 via path 310 over VLAN. After translating the CCM with RDI=1 to a terminate-request formatted in LCP, the terminate-request is forwarded to PPP side 232 via path 312 over PPP circuit indicating the link failure. Upon receiving an LOC recovery and remote MEP learnt via path 314 over VLAN, the PTM converts the LOC recovery to LCP configure-request, and sends the LCP configure-request to PPP side 232 via path 316 over PPP circuit indicating link restoration. Alternatively, the PTM receives an 802.1ag CCM with RDI=0 or without RDI indicating link recovery from Ethernet side 234 via path 314, the PTM converts 802.1ag CCM to LCP configure-request, and then sends the LCP configure-request to PPP side 232 via path 316 over PPP circuit indicating link restoration. After receipt of message(s) of IP and MAC (media access control) address leant on path 318 over VLAN from Ethernet side 234, MSR 106 resumes network service by routing data flows as soon as MSR 106 receives LCP configure-acknowledge coded in PPP from PPP side 232 via path 318 over PPP circuit.

Figure 4:
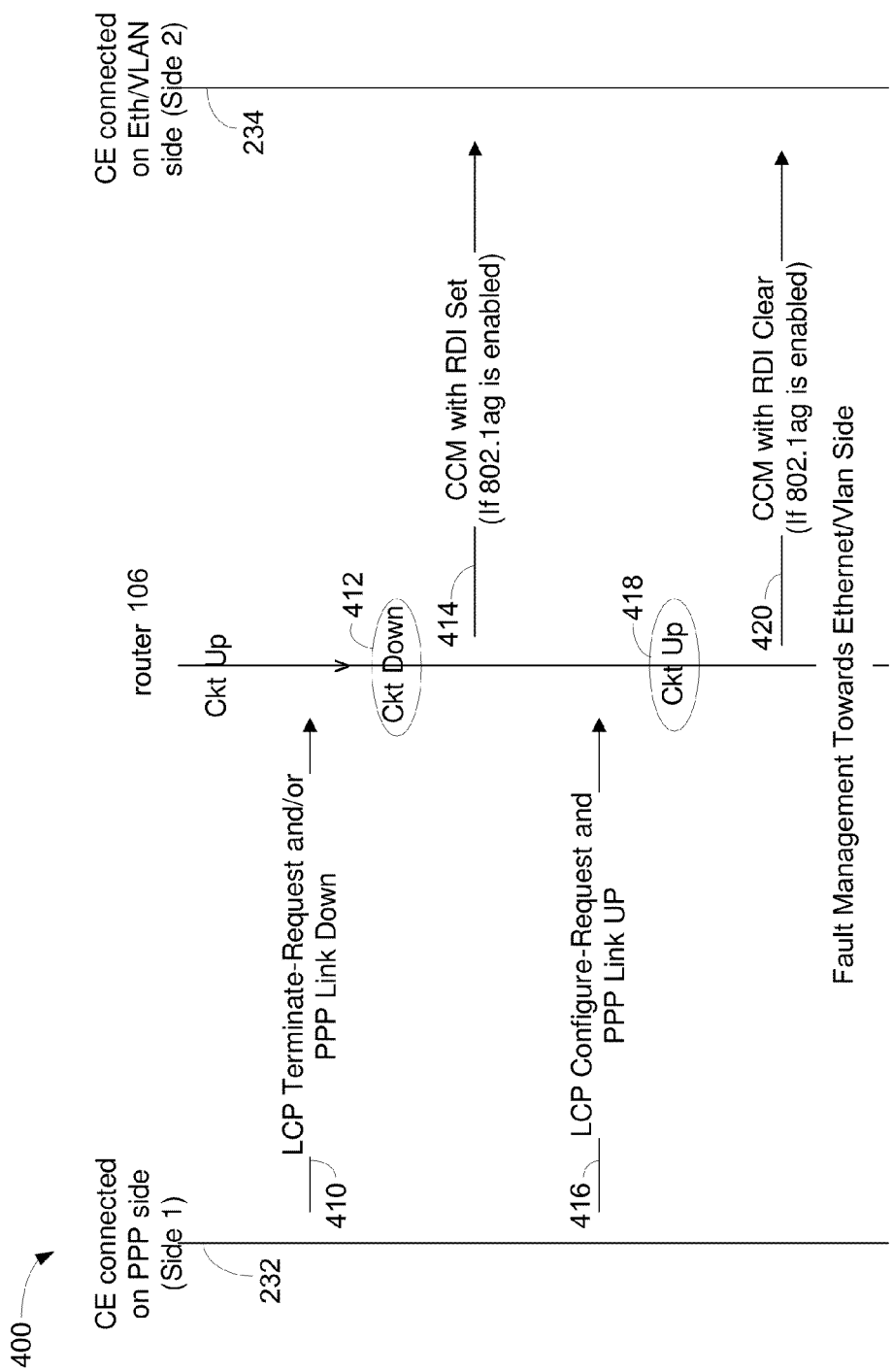
FIG. 4 is a logic flow diagram illustrating an exemplary process of fault management toward Ethernet side in accordance with one embodiment of the present invention.

FIG. 4 is a logic flow diagram 400 illustrating an exemplary process of fault management toward Ethernet side in accordance with one embodiment of the present invention. The process of network fault management receives an LCP terminate-request or a PPP link down message indicating a link failure from PPP side 232 to MSR 106 via path 410 over a PPP circuit. The LCP terminate-request or PPP link down message is translated or converted to 802.1ag CCM with RDI=1 indicating loss of connectivity. Upon suspending or shutting down Ethernet circuit 412, the 802.1ag CCM with RDI=1 is forwarded to Ethernet side 234 via path 414 over VLAN indicating link failure. Upon receipt of an LCP configure-request and/or PPP link up, the PTM translates or converts the LCP configure-request and/or PPP link up to an 802.1ag CCM with RDI=0 (clear or unset value) indicating link resumption. After activating or restoring Ethernet circuit 418, the 802.1ag CCM with RDI=0 or without RDI is sent to Ethernet side 234 via path 420 over VLAN. MSR 106 subsequently resumes network service by routing data flows between PPP side 232 and Ethernet side 234.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 5:
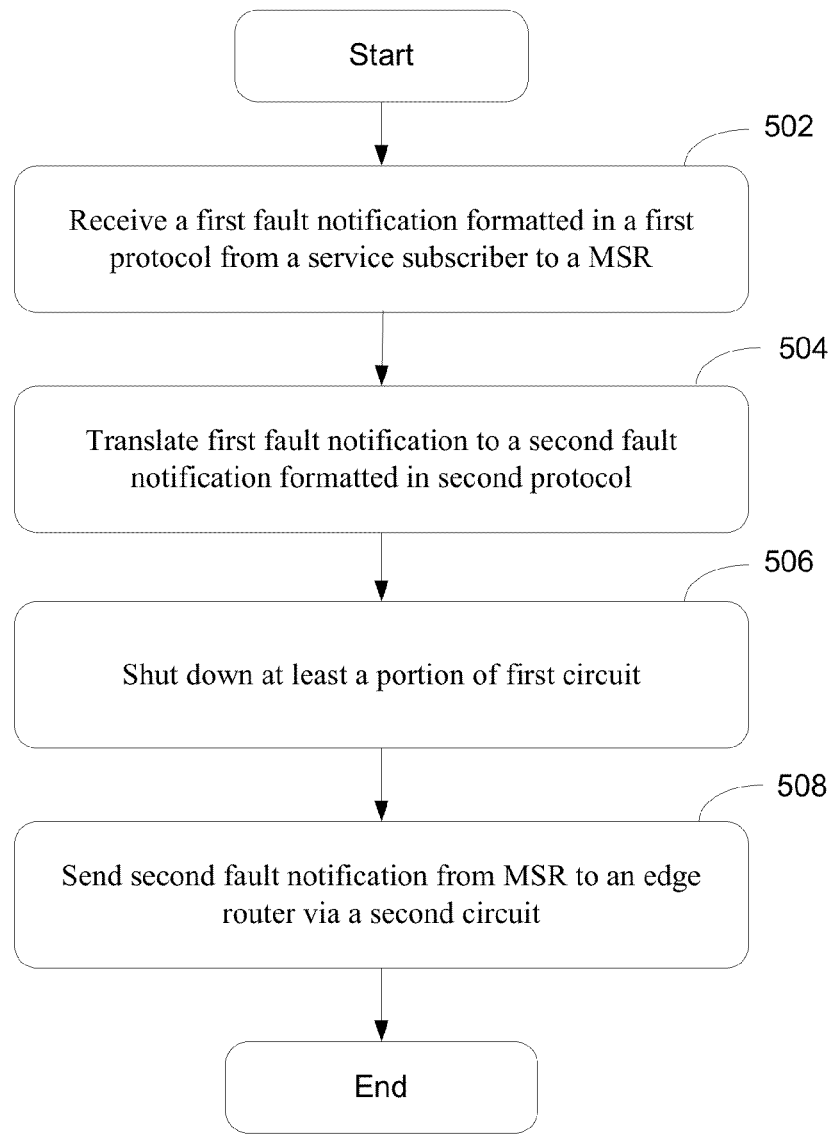
FIG. 5 is a flowchart illustrating an exemplary process of fault management capable of converting a link down message from one network protocol to anther network protocol in accordance with one embodiment of the present invention.

FIG. 5 is a flowchart 500 illustrating an exemplary process of fault management capable of converting a link down message from one network protocol to anther network protocol in accordance with one embodiment of the present invention. A process capable of handing over a fault notification between two networks employing two different network protocols receives, at block 502, a first fault notification formatted in a first protocol from a service subscriber to an optical port of a MSR over a first circuit. The process, for example, is capable of obtaining a link down message formatted in PPP sent from a subscriber to a SONET interface of the MSR via a PPP circuit. In one aspect, a terminate-request formatted in LCP indicating PPP circuit failure is received at the MSR.

At block 504, the first fault notification is translated into a second fault notification formatted in the second protocol. In one embodiment, the PTM converts the first fault notification formatted in the PPP to the second fault notification formatted in IEEE 802.1ag. For example, the process translates a terminate-request formatted in LCP to 802.1ag CCM with RDI=1 (set value) indicating link failure.

At block 506, in response to the 802.1ag CCM with RDI=1, at least a portion of the first circuit is shut down to halt at least a portion of traffic flow. In one aspect, after suspending data traffic on a PPP link, the process sends an acknowledge message coded in the PPP to the service subscriber.

At block 508, the second fault notification is sent from an Ethernet port of the MSR to an edge router via a second circuit. For example, 802.1ag CCM with RDI=1 is forwarded to the edge router via VLAN. In one embodiment, upon receiving a first recovery notification formatted in the first protocol from the service subscriber to the MSR, the first circuit is resumed or restored. For example, the process receives an LCP configure-request from a subscriber to the MSR via a PPP circuit. Upon resuming data traffic on the PPP link, the configure-acknowledge message coded in the PPP is sent to the service subscriber. After translating the first recovery notification into a second recovery notification, the second recovery notification is sent from the Ethernet port of the MSR to the edge router via the second circuit. For instance, upon converting the LCP configure-request to an 802.1ag CCM with RDI=0 (unset or clear), the CCM with RDI having a clear value is forwarded to the edge router via VLAN.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for improving network connection, comprising:
receiving a first fault notification formatted in a first protocol indicating a network fault from a service subscriber to an optical port of a multiservice router ("MSR") over a first circuit, wherein the first circuit is a link transmitting the first fault notification;
translating the first fault notification to a second fault notification formatted in the second protocol;
shutting down at least a portion of the first circuit for suspending traffic flow in response to the first fault notification; and
sending the second fault notification from an Ethernet port of the MSR to an edge router via a second circuit indicating the network fault,
wherein receiving the first fault notification formatted in the first protocol from the service subscriber to the optical port of MSR includes obtaining a link down message formatted in point-to-point protocol ("PPP") from a subscriber to a synchronous optical networking ("SONET") interface of the MSR via a PPP circuit.

2. The method of claim 1, further comprising:
receiving a first recovery notification formatted in the first protocol from the service subscriber to the optical port of the MSR via the first circuit;
resuming the first circuit for network service;
translating the first recovery notification to a second recovery notification formatted in the second protocol; and
sending the second recovery notification from the Ethernet port of the MSR to the edge router via the second circuit.

3. The method of claim 1, wherein obtaining a link down message formatted in point-to-point protocol ("PPP") sent over a PPP circuit further includes receiving a terminate-request formatted in Link Control Protocol ("LCP") indicating that the PPP circuit is down.

4. The method of claim 1, wherein translating the first fault notification to a second fault notification formatted in the second protocol includes converting the first fault notification formatted in the PPP to the second fault notification formatted in IEEE 802.1ag.

5. The method of claim 4, wherein converting the first fault notification formatted in the PPP to the second fault notification formatted in IEEE 802.1ag includes translating a terminate-request formatted in link control protocol ("LCP") to a continuity check message ("CCM") with remote defect indication ("RDI") having a set value indicating link failure.

6. The method of claim 1, wherein shutting down at least a portion of the first circuit includes:
suspending data traffic on a PPP link; and
sending an acknowledge message coded in the PPP to the service subscriber.

7. The method of claim 1, wherein sending the second fault notification from an Ethernet port of the MSR to an edge router via a second circuit includes forwarding a continuity check message ("CCM") with remote defect indication ("RDI") having a set value to the edge router via a virtual local area network ("VLAN").

8. The method of claim 2, wherein receiving a first recovery notification formatted in the first protocol includes receiving a link control protocol ("LCP") configure-request formatted in point-to-point protocol ("PPP") from a subscriber to a synchronous optical networking ("SONET") interface of the MSR via a PPP circuit requesting link resumption.

9. The method of claim 8, wherein resuming the first circuit for network service includes:
resuming data traffic on the PPP link; and
sending a configure-acknowledge message coded in the PPP to the service subscriber.

10. The method of claim 9, wherein translating the first recovery notification to a second recovery notification includes converting the LCP configure-request to a continuity check message ("CCM") with defect indication ("RDI") having a unset value formatted in IEEE 802.1ag indicating link resumption.

11. The method of claim 10, wherein sending the second recovery notification from the Ethernet port of the MSR to the edge router via the second circuit includes forwarding the CCM with RDI having a clear value to the edge router via a virtual local area network ("VLAN").

12. A method for improving network fault management, comprising:
receiving a continuity check message ("CCM") with defect indication ("RDI") having a set value formatted in IEEE 802.1ag indicating a link failure from an edge router to an Ethernet port of a multiservice router ("MSR") via a virtual local area network ("VLAN");
translating the CCM with RDI to a terminate-request formatted in link control protocol ("LCP") at the MSR;
shutting down at least a portion of the VLAN for suspending traffic flow in response to the CCM with RDI; and
sending the terminate-request coded in LCP from the MSR to a service subscriber over a point-to-point protocol ("PPP") circuit indicating the link failure, wherein sending the terminate-request coded in LCP from the MSR to a service subscriber includes obtaining the terminate-request formatted in PPP from a subscriber to a synchronous optical networking ("SONET") interface of the MSR via a PPP circuit.

13. The method of claim 12, further comprising receiving a CCM with RDI having an unset value formatted in IEEE 802.1.ag indicating a link recovery from the edge router to the Ethernet port of the MSR via a VLAN.

14. The method of claim 13, further comprising converting the CCM with RDI having an unset value to an LCP configure-request formatted in the PPP.

15. The method of claim 14, further comprising:
sending the LCP configure-request formatted in PPP from the MSR to the service subscriber over the PPP circuit indicating the link resumption; and
receiving an LCP configure-acknowledge coded in the PPP from the service subscriber to a time-division multiplexing ("TDM") interface of the MSR over the PPP circuit.

16. A network configuration comprising:
a network element ("NE") coupled to Internet and configured to route data traffic to and from the Internet via an Internet Protocol ("IP") based network;
a node coupled to a subscriber and able to route data stream via its synchronous optical networking ("SONET") port;
a router having a SONET port and an Ethernet port and configured to couple to the SONET port of the router to the SONET port of the node via a point-to-point protocol ("PPP") circuit, the Ethernet port coupled to the NE via an Ethernet link, wherein the router is able to route link failure messages between the NE and the node via a protocol translation module which converts the link failure message between optical network protocol and Ethernet network protocols, wherein the router is configured to obtain link failure messages formatted in PPP from the subscriber to a SONET interface via the PPP circuit.

17. The network configuration of claim 16, wherein a network element ("NE") coupled to Internet and configured to route data traffic to and from the Internet via an Internet Protocol ("IP") based network includes an edge router coupled to the router via a virtual local area network ("VLAN").

18. The network configuration of claim 17, wherein a node coupled to a subscriber and able to route data stream via its synchronous optical networking ("SONET") port includes one or more service subscribers and configured to coupled to the router via the PPP circuit capable of transport link control protocol ("LCP") messages regarding connectivity of the PPP circuit.

19. The network configuration of claim 18, wherein the router is a multiservice router having the protocol translation module wherein the protocol translation module is configured to translate the link failure messages between the LCP message formatted in the PPP and a continuity check message ("CCM") formatted in IEEE 802.1ag.

* * * * *